United States Patent [19]

Ohyama et al.

[11] Patent Number: 4,926,200
[45] Date of Patent: May 15, 1990

[54] ELECTROPHOTOGRAPHIC PRINTER

[76] Inventors: Mineo Ohyama; Shigenobu Katagiri; Hiroomi Kozawa; Koutaro Yamada, all of c/o Hitachi Koki Co., Ltd., No. 1060, Takeda, Katsuta-shi, Ibaraki 312, Japan

[21] Appl. No.: 385,889

[22] Filed: Jul. 28, 1989

[30] Foreign Application Priority Data

Jul. 29, 1988 [JP] Japan .............................. 63-191233

[51] Int. Cl.⁵ .......................................... G01D 15/00
[52] U.S. Cl. ................................ 346/160; 346/160.1; 346/154
[58] Field of Search ..................... 346/160, 154, 160.1, 346/107 R, 108; 358/300, 302

[56] References Cited

U.S. PATENT DOCUMENTS

| 4,560,999 | 12/1985 | Tokuhaka | 346/160 |
| 4,752,801 | 12/1988 | Kando | 346/160 |
| 4,772,915 | 9/1988 | Kando | 346/160 |

Primary Examiner—Arthur G. Evans
Attorney, Agent, or Firm—James R. Longacre; Michael L. Keller

[57] ABSTRACT

In an electrophotographic printer, a photoconductive drum is scanned with a light spot provided by scanning light sources to electrostatically form a latent image with dot on it. The light sources comprise at least two LED print heads different in linear density are provided to print out data different in linear density on one and the same page.

4 Claims, 4 Drawing Sheets

ELECTROPHOTOGRAPHIC PRINTER

BACKGROUND OF THE INVENTION

1. Field of the Invention

This invention relates to an electrophotographic printer which makes a print mixed with data different in linear density.

2. Prior Art

In a conventional electrophotographic printer, the resolution is generally a dot density of 240 dots per inch (corresponding to a linear density of 9.4 lines/mm), and EDP (electronic data processing) data such as characters are formed with a dot density of 240 dpi (dots per inch). On the other hand, image data such as figures are generally read with the resolution of a dot density of 400 dots per inch (corresponding to a linear density of 16 lines/mm).

The conventional electrophotographic printer will be described with reference to FIGS. 1 and 2. FIG. 1 shows the arrangement of and electrophotographic printing system, and FIG. 2 is an explanatory diagram showing one example of a print which is to be made by the printing system.

A central processing unit (CPU) 12 applies EDP data having a dot density of 240 dpi to a print control unit 16. An image scanner 13 and a communication terminal 14 applies image data having a dot density of 400 dpi through an image data memory unit 15 to the print control unit 16. The data applied to the print control unit 16 are printed out with a dot density of 240 dpi by an electrophotographic printer 17.

When, in the above-described printing system, data different in dot density are printed out on one and the same page, the data supplied as image data of 400 dpi are printed out with a dot density of 240 dpi. Therefore, the printed image is larger than the original image, as a result of which it is lower in linear density; that is, it is low in picture quality. In the case where image data is read with a dot density of 240 dpi similarly as in the case of EDP image, the image read with an image scanner or the like is different in resolution from the original image, with the results that the printed image is different from the original image in impression, and is lower in picture quality.

SUMMARY OF THE INVENTION

Accordingly, an object of this invention is to eliminate the above-described difficulties accompanying a conventional electrophotographic printer.

More specifically, an object of the invention is to provide an electrophotographic printer which can print out a plurality of data different in linear density on one and the same page.

The foregoing objects and other objects of the invention have been achieved by the provision of an electrophotographic printer in which a photo-conductive drum is canned with a light spot provided by scanning means to electrostatically form a latent image with dot on it; in which the scanning light source means comprises at least two scanning light sources different in dot density, to print out data different in linear density.

The nature, principle and utility of the invention will become more apparent from the following detailed description and the appended claims when read in conjunction with the accompanying drawings.

BRIEF DESCRIPTION OF THE DRAWINGS

In the accompanying drawings.

DETAILED DESCRIPTION OF THE PREFERRED EMBODIMENTS

Preferred embodiments of this invention will be described with reference to the accompanying drawings.

Figure 1:
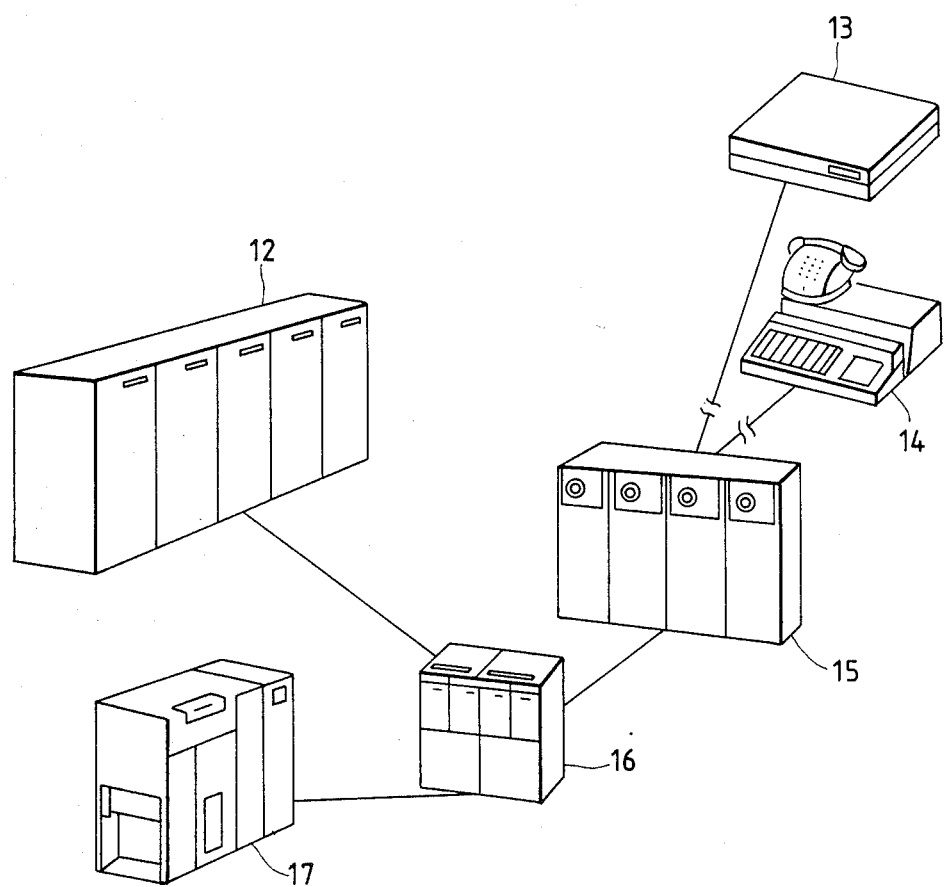
FIG. 1 is an explanatory diagram showing the arrangement of a data printing system.
Figure 2:
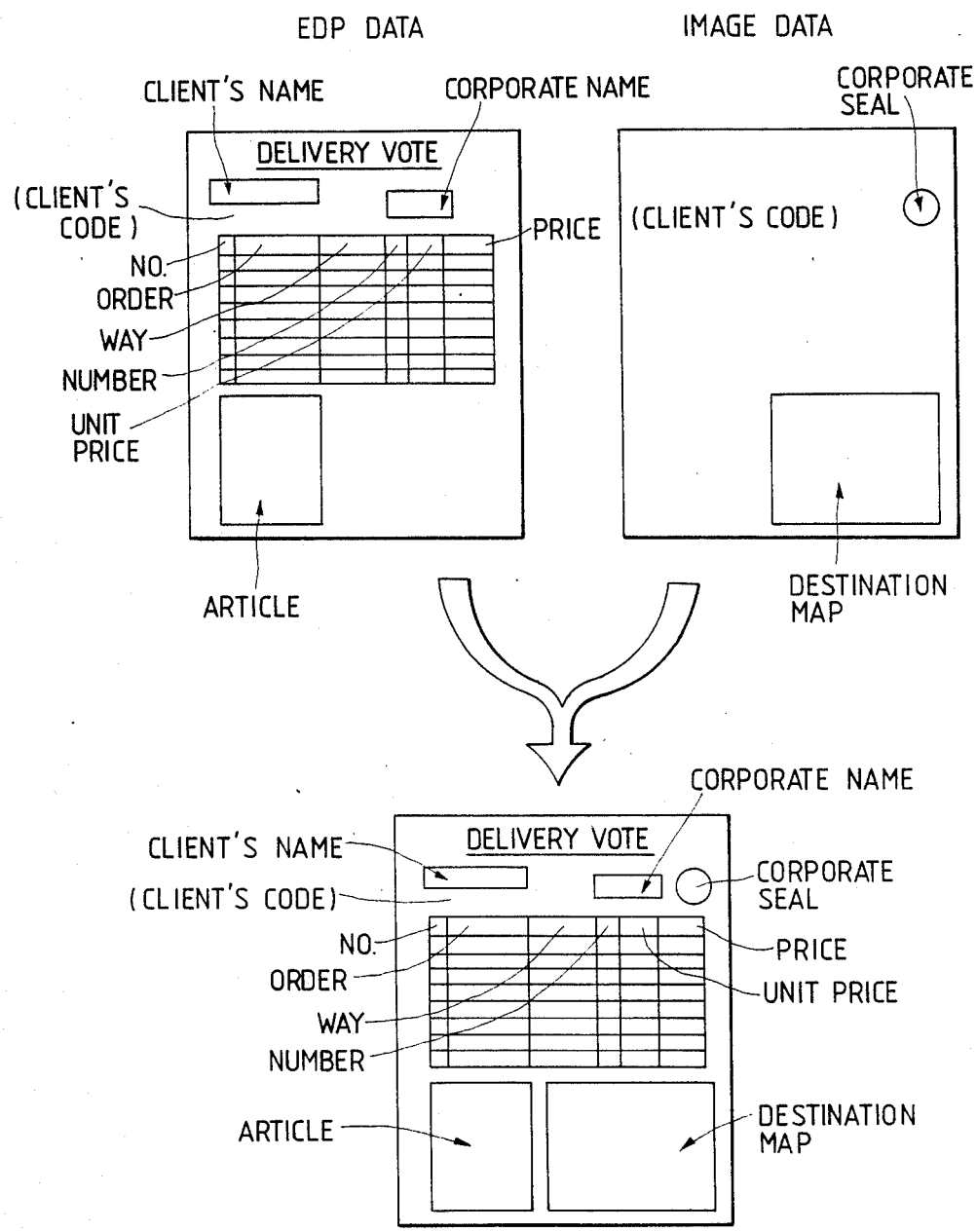
FIG. 2 is an explanatory diagram showing one example of a material to be printed with an electrophotographic printer according to this invention.
Figure 3:
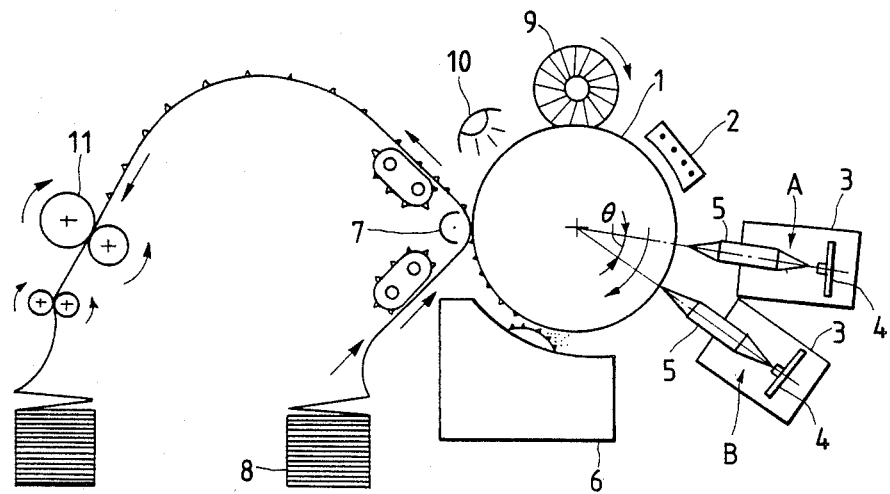
FIG. 3 is an explanatory diagram showing the arrangement of one example of the electrophotographic printer according to the invention.

One example of a electrophotographic printer according to the invention is as shown in FIG. 1.

The surface of a photo-conductive drum 1 is uniformly charged by a charging unit 2, and the latent images of print data are formed on it with LED print heads 3. The LED print heads 3 have SELFOC lens arrays 5, respectively, which are image-forming lenses for focusing light beams emitted from LED arrays 4 on the photoconductive drum 1. The latent images are developed by a developing unit 6 into a toner image on the photoconductive drum 1. The toner image thus formed is transferred onto a printing sheet 8 by a transferring unit 7, and it is pressed and heated by a fixing unit 11 so as to be fixed on the printing sheet. The photo-conductive drum 1, from which the toner image has been transferred, is cleaned with a cleaning unit 9 and discharged with a discharging unit 10. Thus, the electrophotographic printer becomes ready for the following printing operation.

The latent image of EDP data is formed on the photoconductive drum 1 with the LED print head A having a linear density of 240 dpi, whereas the latent image of image data is formed on the drum 1 by using the LED print head B having a linear density of 400 dpi. That is, the latent images different in linear density are simultaneously formed on the photo-conductive drum and developed, and therefore it is possible to print out data different in dot density on one and the same page.

Figure 5:
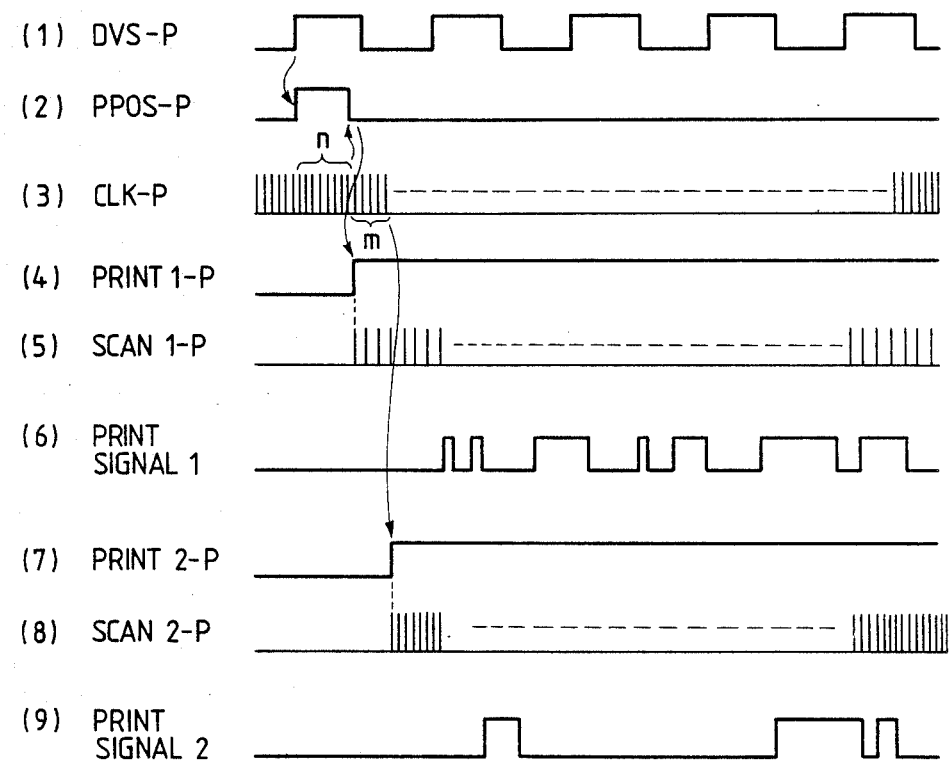
FIG. 5 is a time chart for a description of the operation of the electrophotographic printer according to the invention.

FIG. 5 is a time chart for a description of the operation of the electrophotographic printer according to the invention.

In FIG. 5, reference character DVS-P designates a synchronizing signal for synchronization of a sheet feeding operation with respect to a print start position, and reference character PPOS-P designates a signal for determining a print start position, which is set at the rise of the signal DVS-P and reset when n clock signals CLK-P are counted.

Further in FIG. 5, reference character PRINT1-P designates a gate signal for permitting the print head A to operate which is adapted to print EDP data. The rise of the signal PRINT1-P corresponds to the print start position.

Upon permission of the operation of the print head A by the gate signal PRINT1-P, print signals 1 for printing out EDP data are successively supplied to perform a printing operation. The timing of driving the print head A in the direction of line of the printing sheet is determined by a synchronizing signal SCAN1-P.

Further in FIG. 5, reference character PRINT2-P designates a gate signal for permitting the print head B to operate which is adapted to print image data. The print head B is so positioned that it forms an angle $\theta$ with the print head A. Therefore, the gate signal rises as follows: That is, it is set when m clock signals CLK-P are counted from the time instant that the signal PPOS-P reset.

Upon permission of the operation of the print head B by the gate signal PRINT2-P, print signals for printing out image data are successively supplied to perform a printing operation. The timing of driving the print head B is determined by a synchronizing signal SCAN2-P.

As is apparent from the above description, in the electrophotographic printer of the invention, the optical systems and the data memory units are provided separately for the EDP data and the image data; however, the remaining components are operated simultaneously as two different printers were operated simultaneously.

In the above-described embodiment, data having a linear density of 240 dpi and those having a linear density of 400 dpi are printed out. However, it should be noted that the invention is not limited thereto or thereby. For instance, the technical concept of the invention is applicable to the combination of 200 dpi (corresponding to 8 lines/mm) and 240 dpi for FAX data, or of 200 dpi, 240 dpi and 400 dpi.

Figure 4:
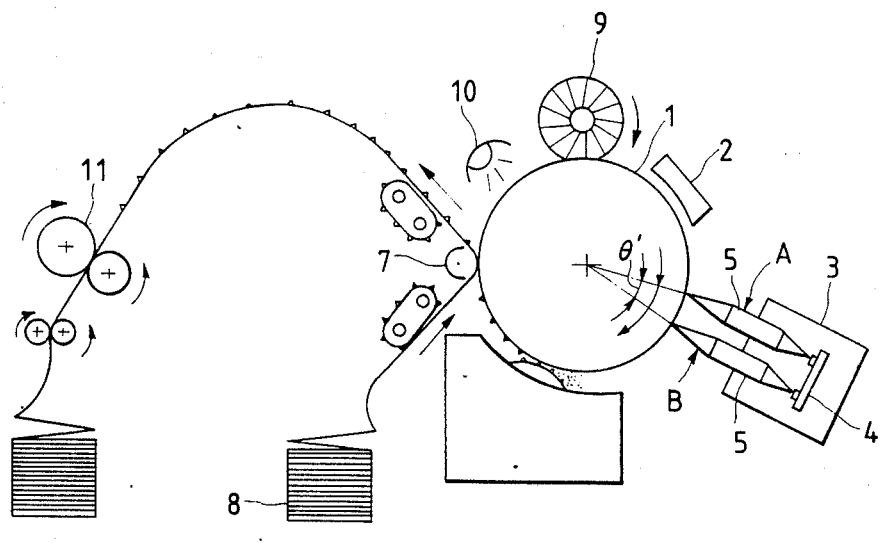
FIG. 4 is an explanatory diagram showing the arrangement of one modification of the electrophotographic printer shown in FIG. 3.

Furthermore, in the above-described embodiment, LED print heads different in dot density are provided. However, the printer heads may be modified as shown in FIG. 4. In the modification, two LED arrays different in linear density are provided on one ceramic board, to form one LED print head.

The gist of the invention resides in that data different in linear density are printed out on one and the same page; however, the electrophotographic printer of the invention may be utilized as follows: When the print signal for printing out EDP data is applied to the LED printer head adapted to print out image data instead of the LED printer head for EDP data, then the data can be printed out with a scale-down of about 0.6. In contrast, when the print signal for printing out image data is applied to the LED print head adapted to print out EDP data instead of the LED printer head for image data, then the data can be printed out with a scale-up of about 1.67.

As is apparent from the above description, the electrophotographic printer according to the invention, having the optical systems different in linear density for processing data different in linear density, can print out an image having different linear densities, as it is.

What is claimed is:

1. An electrophotographic printer for printing data on a printing sheet, comprising:
    photo-conductive means having a surface to be charged;
    means for electrically charging the surface of said photo-conductive means;
    scanning light source means for scanning a light spot on said photo-conductive means to electrostatically form a latent image of print data with dots thereon, said scanning light source means including at least two scanning light sources different in dot density from each other;
    means for developing the latent image into toner image on said photo-conductive means;
    means for transferring said toner image onto a printing sheet; and
    means for fixing said toner image on said printing sheet by pressing and heating operation.

2. An electrophotographic printer as claimed in claim 1, wherein each of said scanning light sources comprises an LED print head.

3. An electrophotographic printer as claimed in claim 1, wherein said scanning light source means comprises an LED head, and said scanning light sources comprise at least two LED arrays provided said LED head.

4. An electrophotographic printer as claimed in claim 1, wherein said print data comprise EDP data and image data, and one of said two scanning light sources being for the EDP data and the other being for the image data.

* * * * *